US 10,795,846 B1

(12) United States Patent
Rathinasabapathi et al.

(10) Patent No.: US 10,795,846 B1
(45) Date of Patent: Oct. 6, 2020

(54) SCALABLE NVME STORAGE MANAGEMENT OVER SYSTEM MANAGEMENT BUS

(71) Applicant: Cisco Technology, Inc., San Jose, CA (US)

(72) Inventors: Rajaganesh Rathinasabapathi, Bangalore (IN); Kiran Bangalore Sathyanarayana, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/511,533

(22) Filed: Jul. 15, 2019

(51) Int. Cl.
*G06F 13/40* (2006.01)
*G06F 13/42* (2006.01)
*G06F 13/16* (2006.01)

(52) U.S. Cl.
CPC ...... *G06F 13/4045* (2013.01); *G06F 13/1668* (2013.01); *G06F 13/4282* (2013.01); *G06F 2213/0016* (2013.01)

(58) Field of Classification Search
CPC ............. G06F 13/4025; G06F 13/1668; G06F 13/4282
See application file for complete search history.

(56) References Cited

U.S. PATENT DOCUMENTS

| | | | | |
|---|---|---|---|---|
| 8,683,486 B2* | 3/2014 | Jones | ................ | H04L 29/08846 719/310 |
| 9,377,967 B2* | 6/2016 | Dube | ................... | G06F 3/0658 |
| 9,933,976 B2* | 4/2018 | Tsujimoto | ................ | G06F 12/00 |
| 10,146,280 B2 | 12/2018 | Remis et al. | | |
| 10,223,313 B2 | 3/2019 | Shih | | |
| 10,255,215 B2 | 4/2019 | Breakstone et al. | | |
| 10,372,364 B2* | 8/2019 | Hsiao | ................... | G06F 3/0626 |
| 2014/0268620 A1* | 9/2014 | Hung | .................. | G06F 15/7803 361/788 |
| 2016/0132078 A1* | 5/2016 | Shen | ................... | G06F 11/2005 361/679.32 |

(Continued)

OTHER PUBLICATIONS

Yan, Mike, et al., "Open Computer Project," Facebook Lighting Hardware System Specification V1.0, Facebook, Inc., Jun. 12, 2017, 68 pages.

(Continued)

*Primary Examiner* — Henry Tsai
*Assistant Examiner* — Christopher Daley
(74) *Attorney, Agent, or Firm* — Edell, Shapiro & Finnan, LLC

(57) ABSTRACT

Presented herein are methodologies for scaling device management over a sideband management bus (SMBUS). A method includes receiving, at a first expander card, from baseboard management controller (BMC), a management message, addressed to a second expander card that is in communication with the first expander card, forwarding the management message to the second expander card, and sending, by the second expander card, the management message, via the sideband management bus, to a device in communication with the second expander card. The device may be, e.g., a Non-Volatile Memory Express (NVMe) drive. Expander cards can be deployed in a daisy chain, providing scalability. Each expander card can also send commands to connected devices in parallel.

19 Claims, 9 Drawing Sheets

(56) References Cited

U.S. PATENT DOCUMENTS

| | | |
|---|---|---|
| 2016/0335220 A1 | 11/2016 | Breakstone et al. |
| 2017/0235519 A1* | 8/2017 | Qiu .................... G06F 3/0688 710/313 |
| 2017/0329736 A1* | 11/2017 | Yu ..................... G06F 3/0604 |
| 2018/0210785 A1* | 7/2018 | Olarig ................ G06F 11/085 |
| 2018/0246833 A1 | 8/2018 | Bai et al. |
| 2018/0285019 A1* | 10/2018 | Olarig ................ H04L 41/0806 |
| 2019/0012490 A1* | 1/2019 | Khatri ................ G06F 21/86 |
| 2019/0073148 A1* | 3/2019 | Adrian ............... G06F 3/0629 |
| 2019/0171602 A1* | 6/2019 | Olarig ................ G06F 13/4022 |

OTHER PUBLICATIONS

Wong, William G., "NVMe over Fabric Addresses Hyperscale Storage Needs", https://goo.gl/images/RyhAJw, Aug. 14, 2017, 15 pages.

* cited by examiner

SCALABLE NVME STORAGE MANAGEMENT OVER SYSTEM MANAGEMENT BUS

TECHNICAL FIELD

The present disclosure relates to managing server components and storage devices using a system management bus (SMBUS).

BACKGROUND

A typical rack server provides an interface to connect multiple Non-Volatile Memory Express (NVMe) drives into a system. Management of these NVMe drives may be handled by a Baseboard Management Controller (BMC) deployed, e.g., on a motherboard of a given server. In recent years, NVMe-based storage drives have been shrinking in size and, as a result, more and more of these devices are being accommodated in a given server or rack. In addition, the cost of employing NVMe drives continues to decrease.

The management of the NVMe drives may be performed via a, sideband, system management bus (SMBUS) interface to the BMC. The sideband SMBUS interface is often used instead of an in-band Peripheral Component Interconnect Express (PCIe) interface because the SMBUS interface does not interfere with the actual storage data path and thus does not impact storage input/output (IO) performance.

As is the case in many implementations, the BMC performs management of NVMe drives using the Management Component Transport Protocol (MCTP). MCTP is a Distributed Management Task Force (DMTF) standard which is platform-agnostic and defines the management protocol between a BMC and managed devices (e.g., NVMe drives, PCIe devices etc.) in a server platform subsystem. MCTP over SMBUS requires a dedicated SMBUS connection between a BMC and each NVMe drive. Thus, the management of a large number of NVMe drives poses a problem for a BMC, as the number of available SMBUS interfaces is limited.

DESCRIPTION OF EXAMPLE EMBODIMENTS

Overview

Presented herein are methodologies for scaling device management over a sideband management bus (SMBUS). A method includes receiving, at a first expander card, from baseboard management controller (BMC), a management message, addressed to a second expander card that is in communication with the first expander card, forwarding the management message to the second expander card, and sending, by the second expander card, the management message, via the sideband management bus, to a device in communication with the second expander card. The device may be, e.g., an NVMe drive.

A system is also described. The system includes a first expander card, a second expander card, each of the first expander card and the second expander card having an interface unit configured to enable network communications, a memory, and one or more processors coupled to the interface unit and the memory, and configured to receive, at the first expander card, from baseboard management controller (BMC), a management message, addressed to the second expander card that is in communication with the first expander card, forward the management message to the second expander card, and send, by the second expander card, the management message, via a sideband management bus (SMBUS), to a device in communication with the second expander card.

EXAMPLE EMBODIMENTS

Embodiments described herein are configured to offload selected management activities and functions from a BMC to one or more "stackable" expander modules, boards or cards (hereafter "expander card(s)") which can scale to support multiple storage devices.

Figure 1:
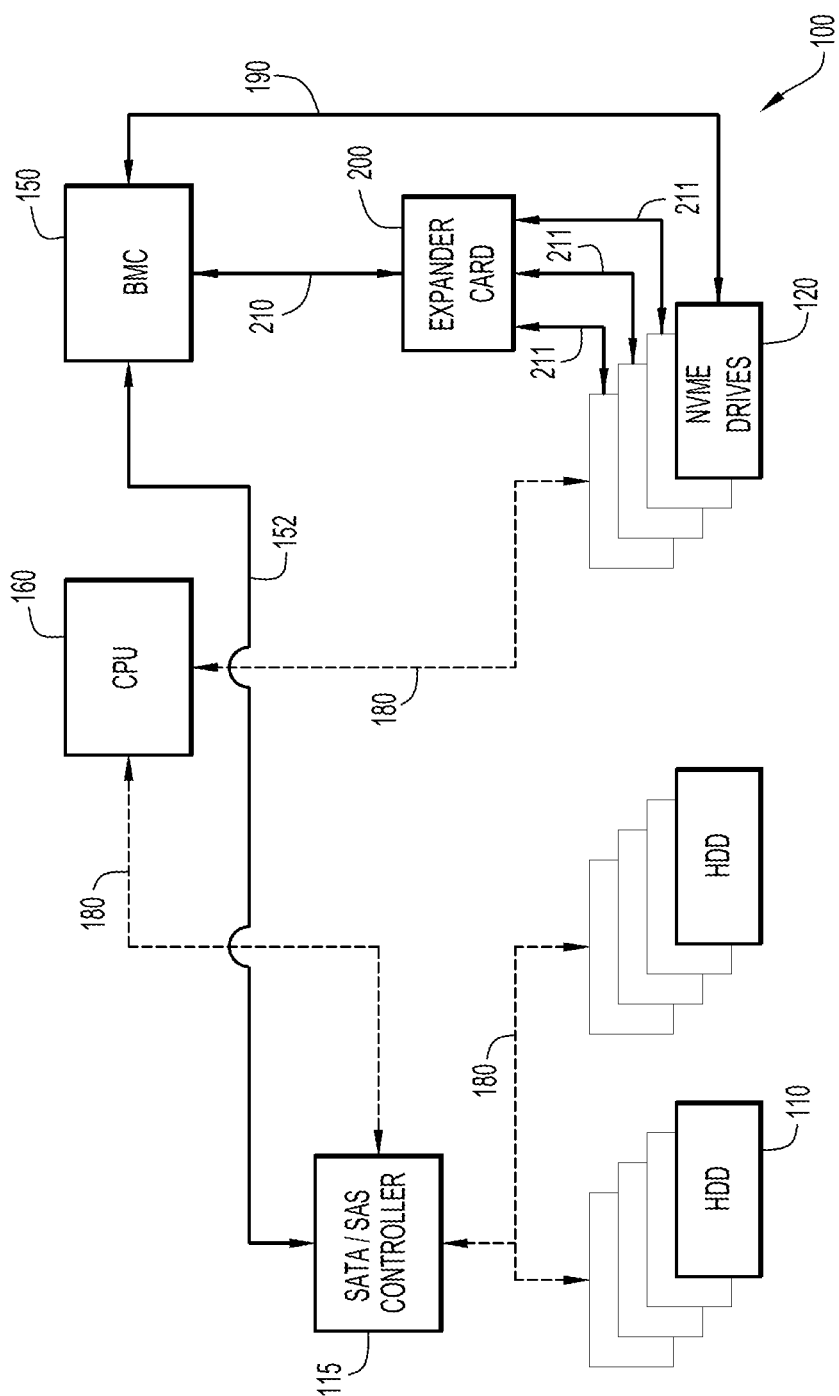
FIG. 1 shows a storage management system in which an expander card may be deployed in accordance with an example embodiment.

FIG. 1 shows a storage management system in which at least one expander card may be deployed in accordance with an example embodiment. As shown, a storage subsystem 100 may include two types of drives: serial-attached SCSI (small computer serial interface) (SAS)/Serial Advanced Technology Attachment (SATA) solid state drive (SSD) hard drives 110, and Non-Volatile memory Express (NVMe) SSD hard drives 120. SAS/SATA SSD hard drives 110 may be controlled by a (SATA/SAS) controller 115 (such as a PCIe adapter card). Controller 115 may be responsible for enabling storage functionalities such as redundant array of independent disks (RAID). SATA/SAS controller 115 itself may be managed by BMC 150 through a single SMBUS, such as an Inter-Integrated Circuit (I2C) interface 152. The NVMe drives 120 can be connected directly to a CPU 160 via, e.g., PCIe bus 180. BMC 150 manages respective NVMe drives 120 via a respective dedicated SMBUS, i.e., I2C bus 190 using, e.g., the MCTP protocol. This approach does not scale well because there are a limited number of I2C ports on BMC 150.

Specifically, with a limited number of I2C ports, if the NVMe drives 120 share the same I2C bus 190, device addressing has to be unique. Further, if NVMe drives 120 use a same I2C slave address, I2C bus multiplexers are needed. I2C multiplexers increase turnaround time for management since only one device/channel can be active at any given time.

To address the scalability issues noted above, an expander card 200, connected to BMC 150 via cable 210, is configured to connect with respective NVMe drives 120 via individual SMBUS or I2C bus connections 211.

Figure 2:
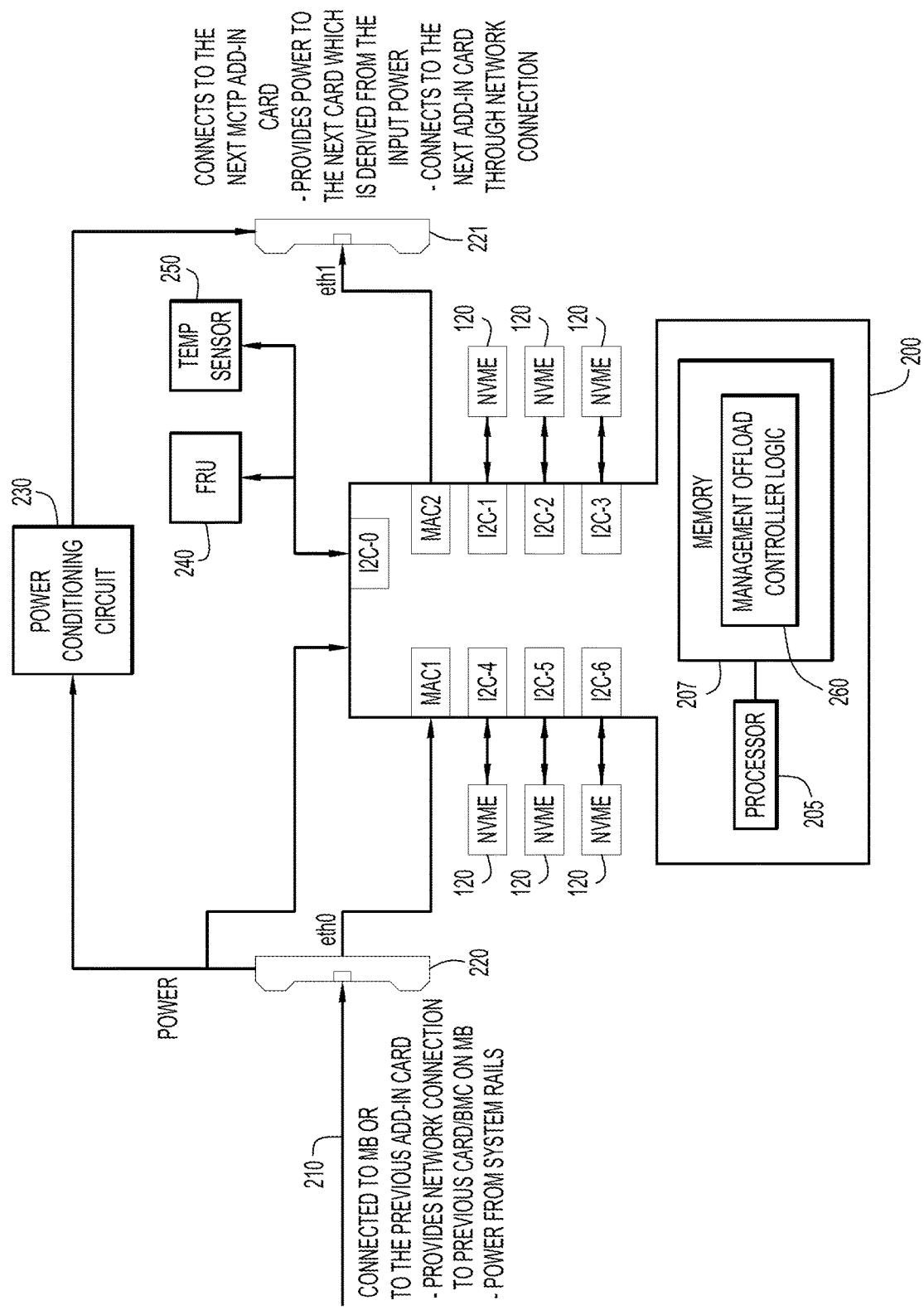
FIG. 2 shows more details of an expander card in accordance with an example embodiment.

FIG. 2 shows details of an expander card 200 in accordance with an example embodiment. Expander card 200 may be implemented as a system on a chip (SoC) having multiple I2C interfaces I2C-1, I2C-2, I2C-3, I2C-4, I2C-5, I2C-6 each being configured to communicate with a respective NVMe drive 120, and to provide network (e.g., Ethernet support) and power distribution functions (including a power conditioning circuit 230).

A field replaceable unit (FRU) 240, which may be implemented as an electronically erasable programmable read only memory (EEPROM) (or, generically, a "memory device"), stores identification data of the expansion card 200 including, e.g., vendor-id, serial number, etc.

A temperature sensor 250 is provided to monitor the temperature of the surroundings of the expander card 200.

A processor 205 is in communication with memory 207, which stores management offload controller logic 260, which, when executed by processor 205, is configured to take on some of the management responsibilities of the BMC 150. Such responsibilities may include system discovery and integration, drive discovery, drive inventory, expander health & drive health monitoring, and drive firmware management, described in more detail further below.

Connector (or port) 220 (designated as interface eth0) and connector (or port) 221 (designated as interface eth1) are configured to carry network traffic (e.g., MCTP over I2C over Ethernet), presence information, and, in some implementations, power.

Figure 3:
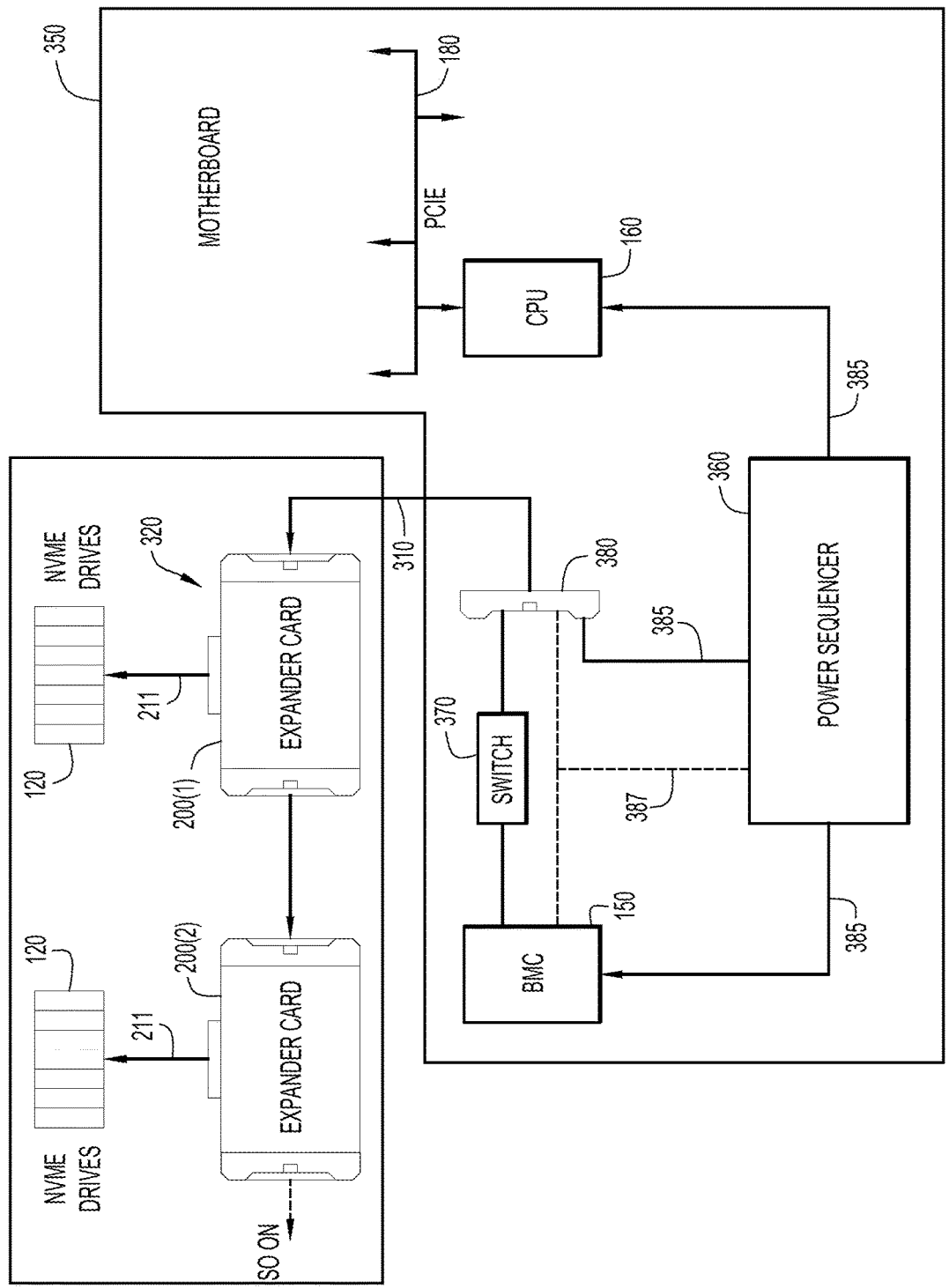
FIG. 3 shows an expander card stack in accordance with an example embodiment.

FIG. 3 shows an expander card stack 320 comprising two expander cards 200(1), 200(2) in accordance with an example embodiment. As noted, each expander cards 200(1), 200(2) (or, generically, 200) are configured to manage, to at least some degree, multiple NVMe devices on behalf of BMC 150.

In an embodiment, a motherboard 350 includes BMC 150, CPU 160, a power sequencer 360, a switch 370 and a connector 380, such as an RJ45 Ethernet cable connector. CPU 160 may be in communication with PCIe bus 180. Power sequencer 360 provides power via power rail 385 to CPU 160, BMC 150 and, (possibly via connector 380), to expander cards 200(1), 200(2). At AC power-on, presence of expander cards 200(1), 200(2) may be detected through a presence GPIO via line 387. If an expander card 200 is present, then power sequencer 360 turns ON power to power up the expander card 200 (or expander cards 200(1), 200(2) . . . if more than one is present). Switch 370 may be an Ethernet switch providing network connectivity between BMC 150 and expander card 200(1), 200(2), etc.

In operation, cable 310 (e.g., an Ethernet cable, or any suitable cable capable of supporting, e.g., the Ethernet protocol) connects connector 380 with a connector of expander card 200(1), thus (possibly providing power, and) network connectivity to the expander card 200(1). Expander card 200(1) can, in turn, pass such (power and) network connectivity to any additional expander cards connected directly or indirectly to expander card 200(1). Cable 310 also carries a presence signal, which is supplied via line 387.

Figure 4:
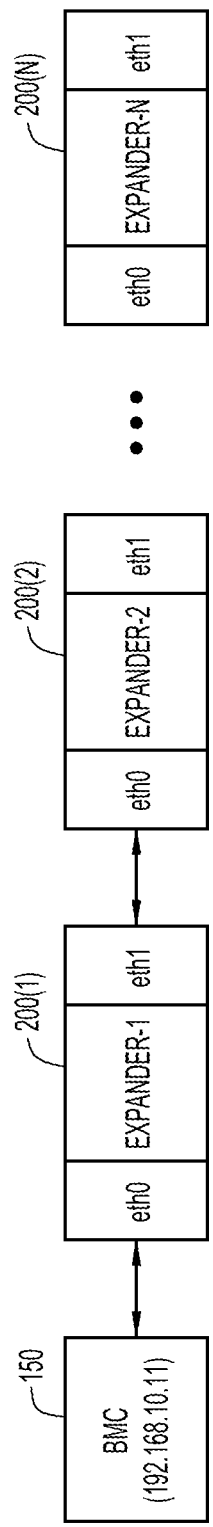
FIG. 4 shows a block diagram of a daisy chain of expander cards in accordance with an example embodiment.

FIG. 4 shows a block diagram of a daisy chain of expander cards in accordance with an example embodiment. As shown, multiple expander cards 201(1), 200(2), . . . 200(N) can be daisy chained together to support an ever increasing number of NVMe drives 120, as further explained below with reference, generally, to FIGS. 2-4.

MAC Address Allocation for Expander Card

Expander card 200 operates with two MAC addresses for respective eth0 and eth1 interfaces associated with connector 220 and connector 221. The two MAC addresses may be programmed in the FRU 240 from the factory. At power-on, management offload controller logic 260 reads the MAC addresses and assigns the same to the eth0 and eth1 interfaces.

Expander Card Operational Flow

At AC power-on, expander card, e.g. 200(1), will read the MAC addresses from the FRU EEPROM 240 and assign the same onto the eth0 and eth1 interfaces. The eth0 interface is configured to always connect to the previous expander card (or BMC 150 if it is first) in the daisy chain and the eth1 interface is configured to always connect to the next expander card in the daisy chain.

In an embodiment, the eth0 interface is assigned a fixed static IP address, e.g., 192.168.10.10, and the eth1 is assigned a different fixed static IP address, e.g., 192.168.10.11. When expander card 200(1) wants to communicate with the next expander card, e.g., 200(2) in the daisy chain, expander card 200(1) sends a packet addressed to 192.168.10.10 over the eth1 interface. When the expander card 200(1) wants to communicate with the previous expander card, or the BMC 150 if expander card 200(1) is the first in the daisy chain, expander card 200(1) sends a packet addressed to 192.168.10.11 over eth0. As such, management command packets are received over the eth0 interface from fixed IP address 192.168.10.11.

Any asynchronous event packet is received over the eth1 interface from the fixed IP address 192.168.10.10.

In this way, expander card firmware, i.e., in the form of management offload controller logic 260, can remain the same irrespective of its position in the stack.

Figure 5:
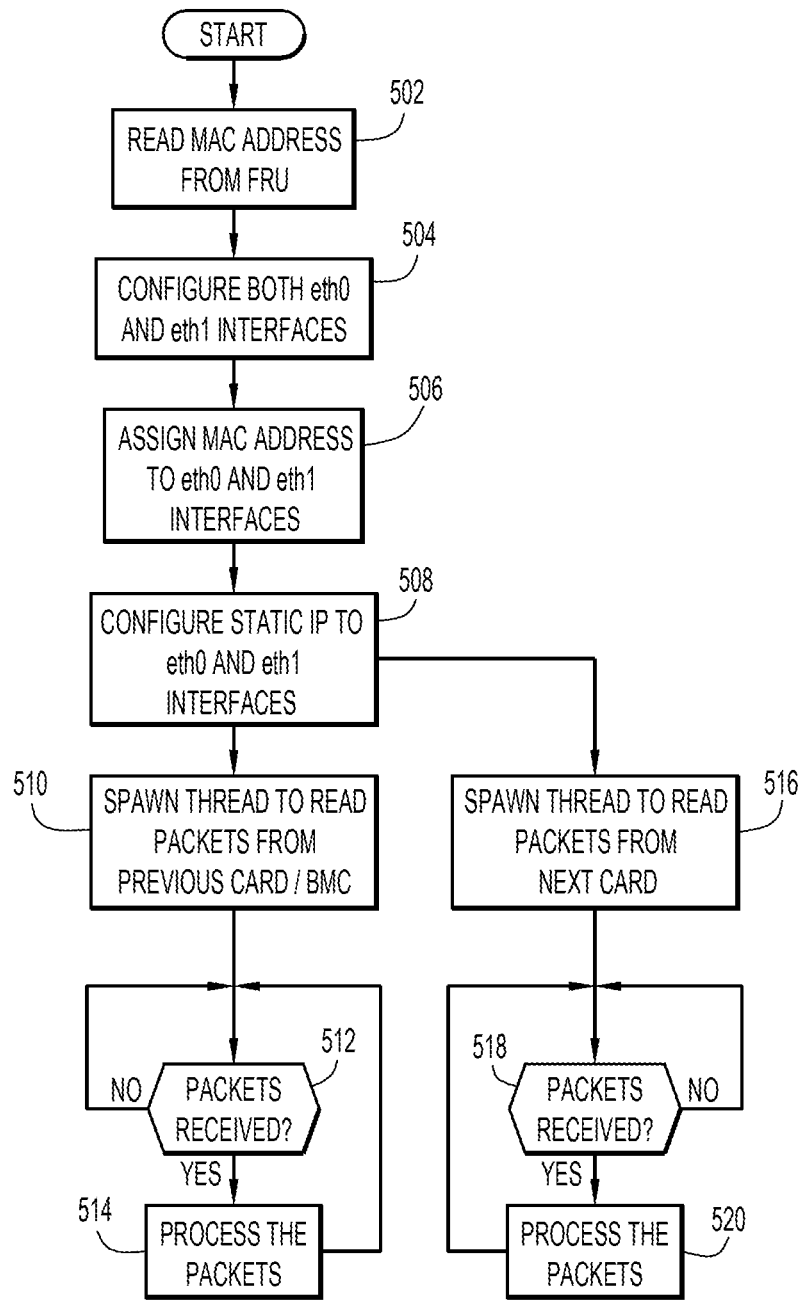
FIG. 5 is a flow chart illustrating expander card network functionality in accordance with an example embodiment.

FIG. 5 is a flow chart illustrating expander card network functionality in accordance with an example embodiment.

At 502, the management offload controller logic 260 (or "the logic" 260) of an expander card reads the MAC addresses from the FRU EEPROM. Then, at 504, the logic 260 configures the eth0 and eth1 interfaces. At 506, the logic 260 assigns the MAC addresses to the eth0 and the eth1 interfaces. At 508, the logic 260 configures the eth0 and the eth1 interfaces with the static IP addresses. At 510, the logic 260 further spawns a thread to read packets from a previous expander card or from the BMC 150. At 512, the logic 260 determines whether any packets have been received. If none has been received, the logic 260 continues to wait until a packet is received. When a packet is received, the logic 260 processes the packet and then waits for additional packets.

At substantially the same time, the logic 260, at 516, spawns a thread to read packets from a next expander card. At 518, the logic 260 determines whether any packets have been received. If none has been received, the logic 260 continues to wait until a packet is received. When a packet is received, the logic 260 processes the packet and then waits for additional packets.

System Discovery and Integration

In an embodiment, logic 260 on each expander card 200, after power-on, first identifies its own position or location in the daisy-chain and notifies the BMC 150. This may be accomplished with the following methodology.

Step 1: a given expander card sends a "Get ID Request" message on network interfaces (eth0) after power-on.

Step 2: the BMC 150 or a Previous "discovered" expander card sends a value '0' or 'n' as a response to the "Get ID Request" message on the eth1 interface (which could also be the BMC's interface). The given expander card saves that value as "my_id" which indicates the position of the expander card in the daisy chain. If a value for my_id of the responding expander card is not yet set, then it will send a "Discovery in Progress" response.

Step 3: Once the given expander card's position is identified, the given expander card will respond to a pending "Get ID Request" message sent by a next expander card with a value of my_id+1.

Step 4: If link status is not present on the eth1 interface of a given expander card 200, this means the given expander card 200 is the last one in the daisy chain and, as a result, that given expander card generates an "Integration Complete (0xFF, my_id)" message to eth0 interface, and that message will makes its way through the chain until it reaches BMC 150.

After all devices respond to BMC 150, integration is complete, and from the "Integration Complete" message, BMC 150 will know the number of expander cards present in the system. Management queries and operations may thereafter be performed by addressing using respective expander IDs.

Figure 6:
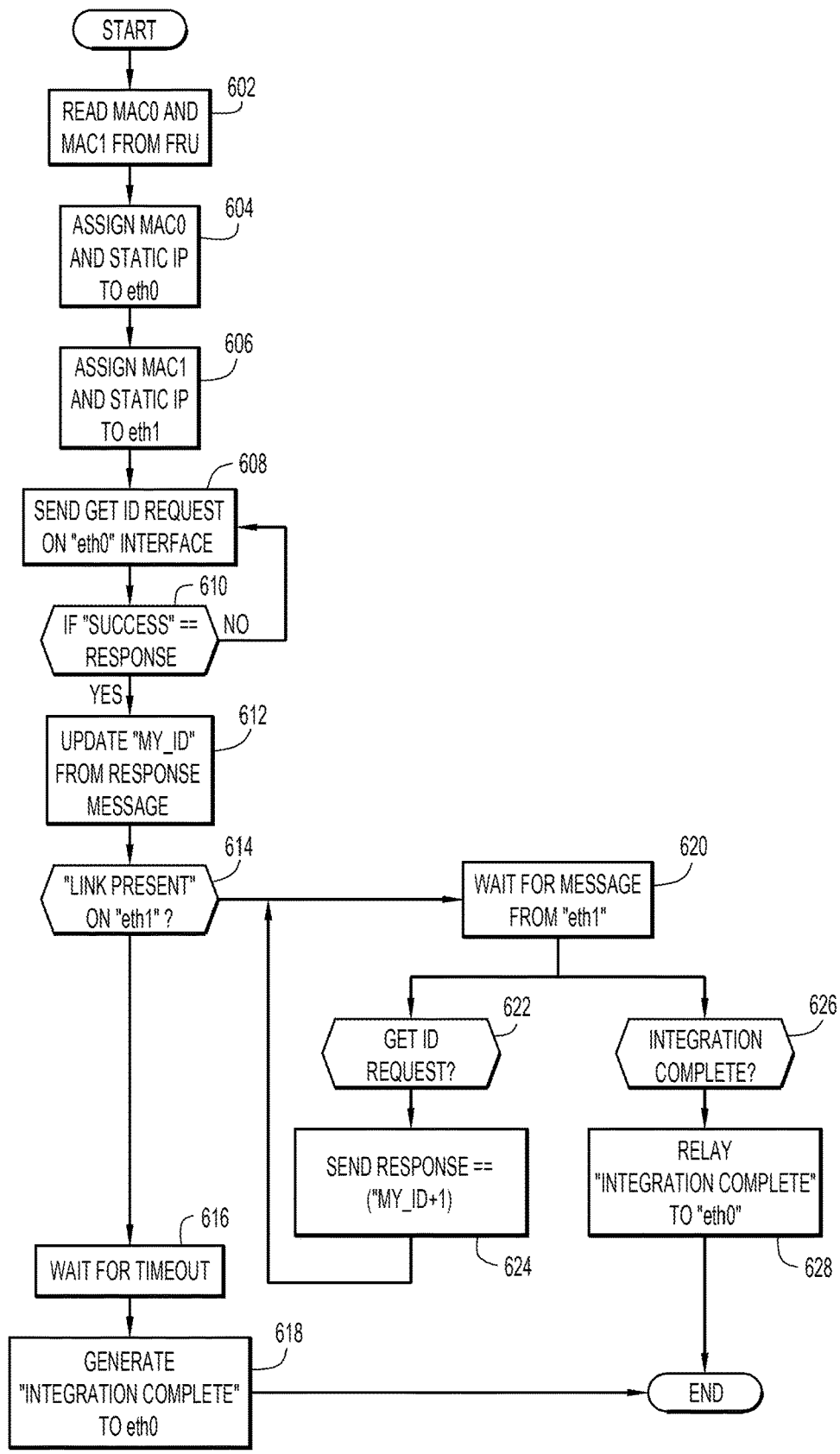
FIG. 6 is a flow chart illustrating expander card discovery functionality in accordance with an example embodiment.

FIG. 6 is a flow chart illustrating expander card discovery functionality in accordance with an example embodiment, consistent with the foregoing discussion. At 602, the logic 260 reads the MAC addresses from the FRU. At 604, the logic 260 assigns MAC0 and a static IP address to eth0. At 606, the logic 260 assigns MAC1 and a static IP address to eth1. At 608, the logic 260 sends a Get ID Request message on eth0. At 610, the logic 260 determines whether a response has been received. If not, operation 608 is repeated. If a response has been received (i.e., "success"), then, at 612, the logic 260 updates "my_id" using information received in the response packet. At 614, the logic determines if a link is present on eth1. If no link is detected, this means that the expander card is the last in the chain. As such, the logic 260, at 616, waits for a time out, and then generates an "Integration Complete" message to eth0. At 614, if a link was detected on eth1, then this means that there is another expander card in the chain. As such, the logic 260, at 620, waits for a message (i.e., packets(s)) on eth1. If the received packet type is a Get ID Request at 622 then, at 624, the logic 260 sends a response including a value of my_id+1, and returns to operation 620. If the message is an "Integration Complete" message at 626, then the logic 260, at 628, sends an "Integration Complete" message to eth0 and the process ends.

Once discovery is complete and all expander cards can be addressed, then each NVMe drive 120 can likewise be discovered and addressed by BMC 150. In one example implementation, drive discovery management via an expander card may be performed using MCTP using NVMe-MI (management interface) management commands.

Inventory information that may be gleaned for each NVMe drive 120 using NVMe-MI may include Vendor ID, universally unique identifier (UUID), Serial Number, and Model, among other information.

Health information that may be gleaned from each NVMe drive 120 using NVMe-MI may include Drive temperature, Percentage Drive Life Used (SMART status), Drive Status Flags, Drive not ready, and Drive functional indicators, among other information.

Expander card health information (e.g., temperature) may also be obtained by BMC 150 from each expander card 200.

Management offload controller logic 260 may be configured to communicate with each expander card 200 in a chain of expander cards using the following message format: Source ID, Destination ID (0xFF, if broadcast), Message Type, Command-ID, Command/Data Payload.

The following are example expander card Discovery Message Types:
  Get ID Req (Synchronous From Expander, eth0)
  Get ID Resp(Synchronous From Expander/BMC, eth1)
  Integration Complete (Asynchronous From Expander, eth0)
  Offload Management Message (one of below messages addressed to BMC 150 or an expander card 200).

Figure 7:
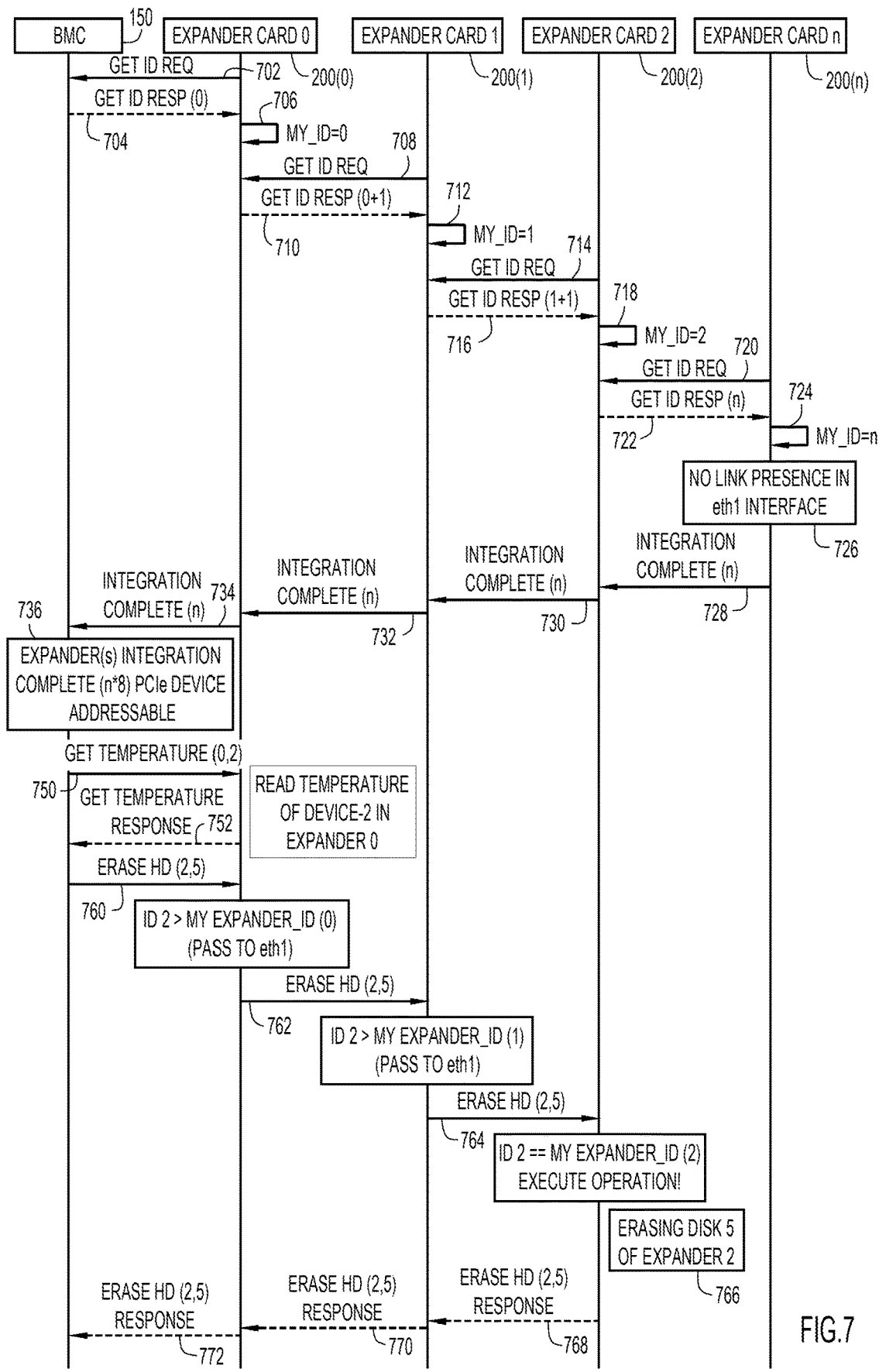
FIG. 7 is a ladder diagram illustrating an expander card discovery sequence and offload management messages in accordance with an example embodiment.

The following are example Offload Management Messages Types:
  Send Drive/Device Presence (Asynchronous From Expander)
    Expander no, No.of.Slots Bitmap, No.ofdevicepresent Bitmap
  Send Expander Health (Asynchronous From Expander)
    Expander no, overall status (expander temp, worst dev temp)
  Drive/Device health if requested (Synchronous From BMC)
    Expander no, dev no, health status
  Send Drive/Device Inventory ((A)synchronous From Expander)
    Expander no, device no, dev-uuid, dev-4-part-id,dev-serial
  Proxy Command Transmit storage management commands back to BMC. (Synchronous From BMC)
    Expander no, write len, write data, read len, read data
  Heartbeat Message & Link Lost Event
    Id of the expander card which did not respond to a heartbeat message
  Firmware upgrade (if all drives are same model)
    Receive firmware from BMC, store in buffer
    Update drives/devices in parallel
    Send update log back to BMC FIG. 7 is a ladder diagram illustrating an expander card discovery sequence and offload management messages in accordance with an example embodiment. As shown in the figure, a BMC 150 may communicate with one of several expander cards 200(0), 200(1), 200(2), 200(n). At 702, expander card 200(0) sends a Get ID request to BMC 150. At 704, BMC 150 responds with a Get ID response including a value of "0", which indicates that expander card 200(0) has a my_id value of 0, as indicated by 706. At 708, expander card 200(1) sends a Get ID request to expander card 200(0). At 710, expander card 200(0) responds with a Get ID response including a value of "0+1", which indicates that expander card 200(1) has a my_id value of 1, as indicated by 712.

At 714, expander card 200(2) sends a Get ID request to expander card 200(1). At 716, expander card 200(1) responds with a Get ID response including a value of "1+1", which indicates that expander card 200(2) has a my_id value of 2, as indicated by 718. At 720, expander card 200(n) sends a Get ID request to expander card 200(2). At 722, expander card 200(2) responds with a Get ID response including a value of n, which indicates that expander card 200(n) has a my_id value of n, as indicated by 724.

At 726, expander card n determines that there is no link present on its eth1 interface. As such, expander card 200(n), sends an Integration Complete message 728 including the value n towards expander card 200(2), which in turn forwards the message via, 730, 632 and 734 until it reaches BMC 150. BMC 150 then determines that there may be n*6 addressable NVMe drives 120 that can be individually accessed as indicated by 736. It is noted that the example implementation described herein includes six I2C ports per expander card 200. However, those skilled in the art will appreciate that there could more or fewer such ports on an expander card 200.

As an example, assume BMC 150 wants to learn the temperature of a given NVMe drive 120. At 750, BMC 150 sends a Get Temperature message that includes the values (0, 2) indicating that the message is intended for NVMe drive 120 accessible via expander card 200(0) at I2C-2. At 752, expander card 200(0) will thus respond, at 752, with a Get Temperature Response (with appropriate value).

As another example, assume BMC 150 may want to erase a given hard drive, namely drive 5 on expander card 200(2). In this case, BMC 150 sends an Erase HD (2, 5) message at 760. That message is passed at 762 and 764 to expander 200(2) where the erase operation is executed at 766. An acknowledgment in the form of an Erase HD (2, 5) Response may be sent back to BMC 150 via 768, 770, and 772.

Parallelization of Management Commands

Figure 8:
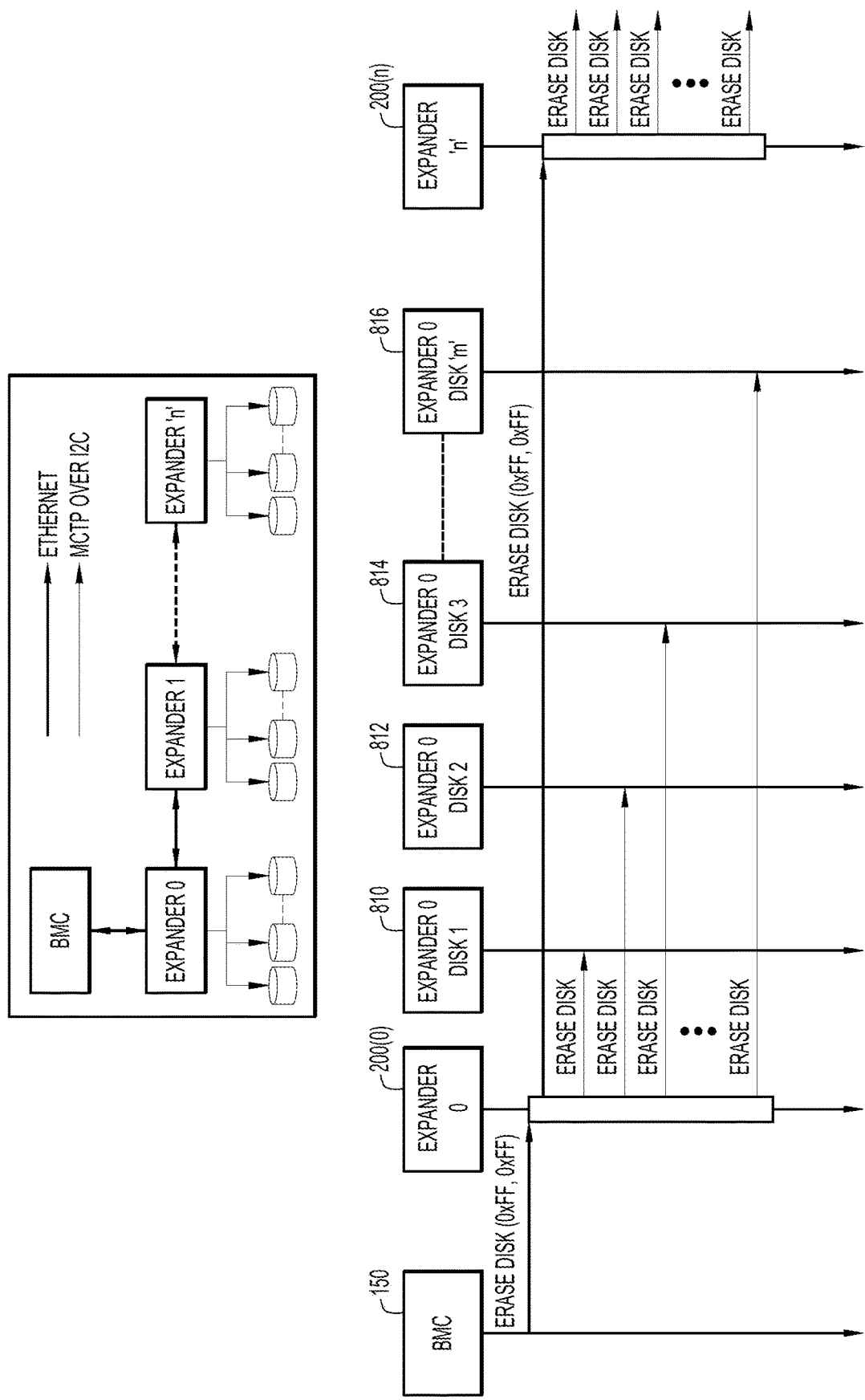
FIG. 8 illustrates how a BMC can send commands as broadcast packets to expander cards in accordance with an example embodiment.

Parallelization over the SMBUS/I2C is not feasible in traditional approaches using I2C multiplexers, in that all the commands will be sequential due to multiplexer channel selection, and hence the time required to address the configuration commands increases linearly as the number of NVMe drives increases in the system. The embodiments described herein, on the other hand, can achieve parallelization of configuration commands over the SMBUS. In this regard, FIG. 8 illustrates how BMC 150 can send commands as broadcast packets to expander cards 200 in accordance with an example embodiment.

As shown in the figure, an Erase Disk message may be broadcast to all expander cards 200(0) . . . 200(n) and all devices connected thereto (0xFF, 0xFF). This message, or command, is received, effectively in parallel, by each expander card 200(0) . . . 200(n) and each disk 810, 812, 814, 816 in communication with expander card 200(0), and each disk in communication with expander card 200(n).

Error Handling

The link status of a next expander card 200 may be monitored by management offload controller logic 260. The logic 260 may detect any physical disconnection of an expander card in the chain. Whenever there is a disconnection, an asynchronous message may be transmitted to BMC 150 with the expander card slot-id and indicating the failure. BMC 150 may accordingly raise a fault to the user to prompt for next actions from the user.

Management offload controller logic 260 may send heartbeat messages to the next expander card in the chain and may monitor a response from the same. When any expander card firmware gets hung/becomes unresponsive, then there will be no ping responses from the same. This will be detected from the expander card initiating the ping request and an asynchronous message may be transmitted to BMC 150 with the expander slot-id and indicating the failure. BMC 150 may accordingly raise a fault to the user to prompt for next actions from the user.

Figure 9:
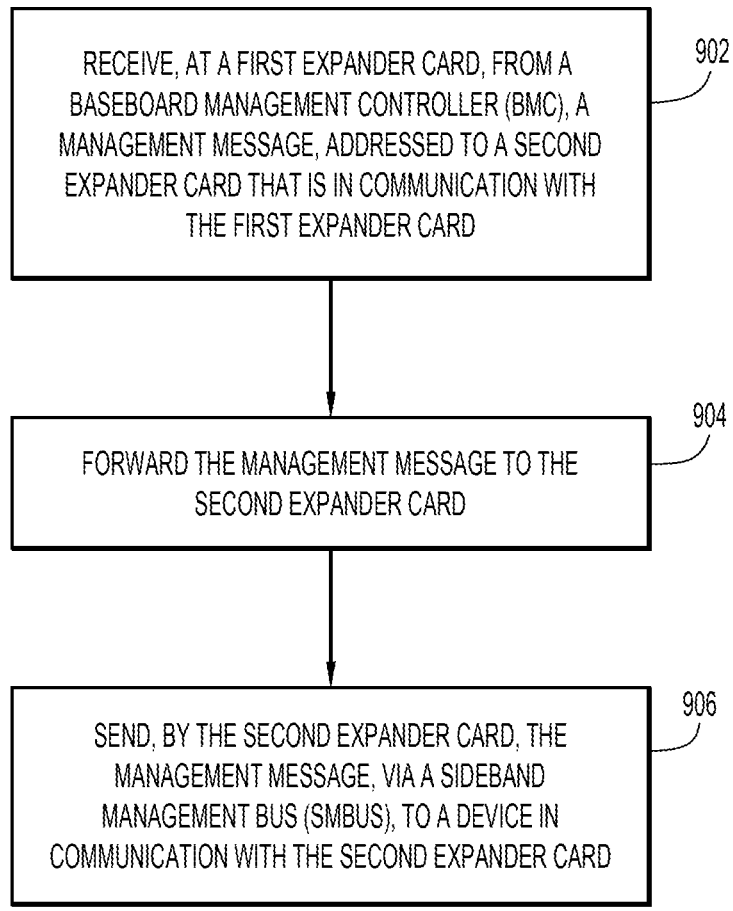
FIG. 9 is a flowchart illustrating a series of operations in accordance with an example embodiment.

FIG. 9 is a flowchart illustrating a series of operations in accordance with an example embodiment. The operations of FIG. 9 assume a stack or chain of expander cards as described herein. At 902, a first expander card receives, from baseboard management controller (BMC), a management message, addressed to a second expander card that is in communication with the first expander card. At 904, the first expander card forwards the management message to the second expander card. And, at 906, the second expander card sends the management message, via a sideband management bus (SMBUS), to a device in communication with the second expander card.

Embodiments described here reduce hardware complexity in storage subsystem design, and moves away from the traditional approach of using I2C multiplexers to connect multiple device (i.e., NVMe drives). The instant embodiments provide scalability by providing a "stackable" configuration, with little to no additional software complexity.

Moreover, the approach platform agnostic, and provides a unique method of discovering the expander cards present in the system and, in turn, the number of NVMe drives present in the system. BMC management software does not need to be modified, even when the number of NVMe drives increases in the system.

The present embodiments also provide secure a communication protocol between the BMC and expander cards to achieve configuration and management of NVMe drives over the SMBUS. The communication may be performed using an encrypted TCP connection, thus enhancing security.

The commands to NVMe drives can be executed in parallel and, hence, efficiency can be improved. For example, erasure of multiple NVMe drives can be triggered in parallel.

The BMC's management tasks are greatly reduced due to management offload. Finally, the present embodiments make use of industry standard storage management through MCTP and NVMe-MI.

Those skilled in the art will appreciate that the embodiments described herein may also offload configuration and management interfaces with Ethernet for the following technologies: universal system bus (USB), PCIe cards, cooling subsystem interface, JTAG interface, and/or the reduced gigabit media-independent interface (RGMII)/reduced media-independent interface (RMII) Management Interfaces.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes receiving, at a first expander card, from baseboard management controller (BMC), a management message, addressed to a second expander card that is in communication with the first expander card; forwarding the management message to the second expander card; and sending, by the second expander card, the management message, via a sideband management bus (SMBUS), to a device in communication with the second expander card.

In an embodiment, the device may be a non-volatile memory express (NVMe) drive.

In one embodiment, the receiving and the forwarding may include receiving and forwarding via an Ethernet connection between the BMC and the first expander card, and between the first expander card and the second expander card, respectively.

In another embodiment, the Ethernet connection may be implemented over a cable that also provides a presence indicator signal for the first expander card.

In still another embodiment, the method may include sending the management message, in parallel, to a plurality of devices in communication with the second expander card.

The method still further include sending the management message via an inter-integrated circuit (I2C) connection between the second expander card and the device in communication with the second expander card.

The method may also include each of the first expander card and the second expander card discovering its respective location in a chain of connected expander cards comprising the first expander card and the second expander card.

The method may still further include each of the first expander card and the second expander card including a first Ethernet port and a second Ethernet port, and the first Ethernet port of each of the first expander card and the second expander card has a first same Internet Protocol (IP) address, and the second Ethernet port on each of the first expander card and the second expander card has a second same IP address.

The method may also include reading the first same IP address and the second same IP address from a memory device deployed on each of the first expander card and the second expander card.

In an embodiment, sending, by the second expander card, the management message, via the sideband management bus (SMBUS), to the device in communication with the second expander card, includes sending the management message via Management Component Transport Protocol (MCTP).

In another form, a system may also be provided in accordance with an embodiment. The system may include a first expander card; a second expander card, each of the first expander card and the second expander card comprising: an interface unit configured to enable network communications; a memory; and one or more processors coupled to the interface unit and the memory, and configured to: receive, at the first expander card, from baseboard management controller (BMC), a management message, addressed to the second expander card that is in communication with the first expander card; forward the management message to the second expander card; and send, by the second expander card, the management message, via a sideband management bus (SMBUS), to a device in communication with the second expander card.

In embodiment, the device may be a non-volatile memory express (NVMe) drive.

In an embodiment the one or more processors may be configured to receive and to forward by receiving and forwarding via an Ethernet connection between the BMC and the first expander card, and between the first expander card and the second expander card, respectively.

In on embodiment, the Ethernet connection may be implemented over a cable that also provides a presence indicator signal for the first expander card.

In an embodiment the one or more processors may be configured to send the management message, in parallel, to a plurality of devices in communication with the second expander card.

In another embodiment the one or more processors may be configured to send the management message, via the sideband management bus (SMBUS), by sending the management message via an inter-integrated circuit (I2C) connection between the second expander card and the device in communication with the second expander card.

In another embodiment the one or more processors may be configured to cause each of the first expander card and the second expander card to discover its respective location in a chain of connected expander cards comprising the first expander card and the second expander card.

In still another embodiment, each of the first expander card and the second expander card includes a first Ethernet port and a second Ethernet port, and the first Ethernet port of each of the first expander card and the second expander card has a first same Internet Protocol (IP) address, and the second Ethernet port on each of the first expander card and the second expander card has a second same IP address.

In still another form, a non-transitory computer readable storage media is provided that is encoded with instructions that, when executed by a processor, cause the processor to: receive, at a first expander card, from baseboard management controller (BMC), a management message, addressed to a second expander card that is in communication with the first expander card; forward the management message to the second expander card; and send, by the second expander card, the management message, via a sideband management bus (SMBUS), to a device in communication with the second expander card.

The instructions may further include instructions that, when executed by a processor, cause the processor to send the management message, via the sideband management bus (SMBUS), by sending the management message via an inter-integrated circuit (I2C) connection between the second expander card and the device in communication with the second expander card.

The above description is intended by way of example only. Various modifications and structural changes may be made therein without departing from the scope of the concepts described herein and within the scope and range of equivalents of the claims.

What is claimed is:

1. A method comprising:
   receiving, at a first expander card, from baseboard management controller (BMC), a management message, addressed to a second expander card that is in communication with the first expander card;
   forwarding the management message to the second expander card; and
   sending, by the second expander card, the management message, via a sideband management bus, to a device in communication with the second expander card,
   wherein each of the first expander card and the second expander card includes a first Ethernet port and a second Ethernet port, and the first Ethernet port of each of the first expander card and the second expander card has a first same Internet Protocol (IP) address, and the second Ethernet port on each of the first expander card and the second expander card has a second same IP address, different from the first same IP address.

2. The method of claim 1, wherein the device comprises a non-volatile memory express (NVMe) drive.

3. The method of claim 1, wherein the receiving and the forwarding comprises receiving and forwarding via an Ethernet connection between the BMC and the first expander card, and between the first expander card and the second expander card, respectively.

4. The method of claim 3, wherein the Ethernet connection is implemented over a cable that also provides a presence indicator signal for the first expander card.

5. The method of claim 1, further comprising sending the management message, in parallel, to a plurality of devices in communication with the second expander card.

6. The method of claim 1, wherein sending the management message, via the sideband management bus, comprises sending the management message via an inter-integrated circuit (I2C) connection between the second expander card and the device in communication with the second expander card.

7. The method of claim 1, further comprising each of the first expander card and the second expander card discovering its respective location in a chain of connected expander cards comprising the first expander card and the second expander card.

8. The method of claim 1, further comprising reading a first MAC address corresponding to the first same IP address and a second MAC address corresponding to the second same IP address from a memory device deployed on each of the first expander card and the second expander card.

9. The method of claim 8, wherein the memory device comprises a field replaceable unit (FRU).

10. The method of claim 1, wherein sending, by the second expander card, the management message, via the sideband management bus, to the device in communication with the second expander card, comprises sending the management message via Management Component Transport Protocol (MCTP).

11. A system comprising:
a first expander card;
a second expander card,
each of the first expander card and the second expander card comprising:
- an interface unit configured to enable network communications;
- a memory; and
- one or more processors coupled to the interface unit and the memory, and configured to:
  - receive, at the first expander card, from baseboard management controller (BMC), a management message, addressed to the second expander card that is in communication with the first expander card;
  - forward the management message to the second expander card; and
  - send, by the second expander card, the management message, via a sideband management bus, to a device in communication with the second expander card,
  - wherein each of the first expander card and the second expander card includes a first Ethernet port and a second Ethernet port, and the first Ethernet port of each of the first expander card and the second expander card has a first same Internet Protocol (IP) address, and the second Ethernet port on each of the first expander card and the second expander card has a second same IP address, different from the first same IP address.

12. The system of claim 11, wherein the device comprises a non-volatile memory express (NVMe) drive.

13. The system of claim 11, wherein the one or more processors are configured to receive and to forward by receiving and forwarding via an Ethernet connection between the BMC and the first expander card, and between the first expander card and the second expander card, respectively.

14. The system of claim 13, wherein the Ethernet connection is implemented over a cable that also provides a presence indicator signal for the first expander card.

15. The system of claim 11, wherein the one or more processors are configured to send the management message, in parallel, to a plurality of devices in communication with the second expander card.

16. The system of claim 11, wherein the one or more processors are configured to send the management message, via the sideband management bus, by sending the management message via an inter-integrated circuit (I2C) connection between the second expander card and the device in communication with the second expander card.

17. The system of claim 11, wherein the one or more processors are configured to cause each of the first expander card and the second expander card to discover its respective location in a chain of connected expander cards comprising the first expander card and the second expander card.

18. A non-transitory computer readable storage media encoded with instructions that, when executed by a processor, cause the processor to:
- receive, at a first expander card, from baseboard management controller (BMC), a management message, addressed to a second expander card that is in communication with the first expander card;
- forward the management message to the second expander card; and
- send, by the second expander card, the management message, via a sideband management bus, to a device in communication with the second expander card,
- wherein each of the first expander card and the second expander card includes a first Ethernet port and a second Ethernet port, and the first Ethernet port of each of the first expander card and the second expander card has a first same Internet Protocol (IP) address, and the second Ethernet port on each of the first expander card and the second expander card has a second same IP address, different from the first same IP address.

19. The non-transitory computer readable storage media of claim 18, wherein the instructions, when executed by a processor, cause the processor to send the management message, via the sideband management bus, by sending the management message via an inter-integrated circuit (I2C) connection between the second expander card and the device in communication with the second expander card.

* * * * *